Feb. 16, 1965 S. B. MAURER 3,169,585
POWER OPERATED ROTARY IMPACT TOOL
Filed Jan. 11, 1961 7 Sheets-Sheet 1

INVENTOR.
SPENCER B. MAURER
BY
Eber J. Hyde
ATTORNEY

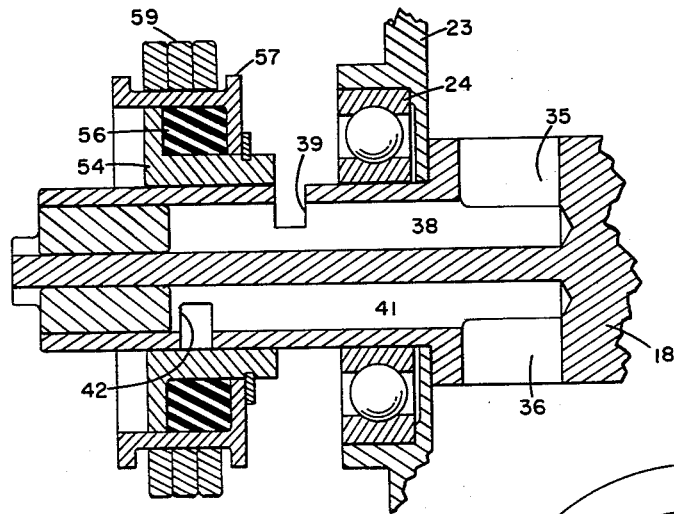
FIG. IF
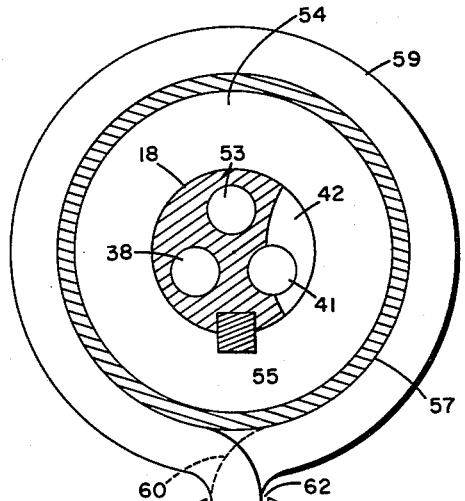
FIG. 3
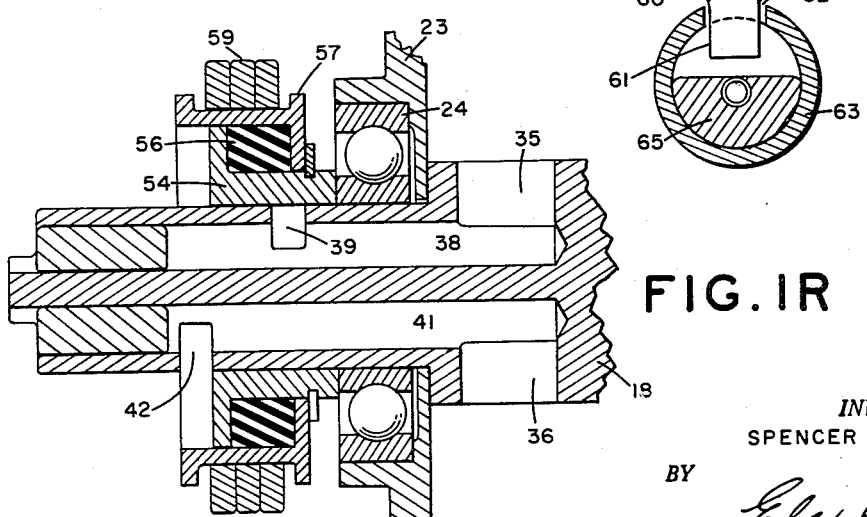
FIG. IR
INVENTOR.
SPENCER B. MAURER

INVENTOR.
SPENCER B. MAURER
BY
ATTORNEY

*INVENTOR.*
SPENCER B. MAURER
BY
*Eben J. Hyde*
ATTORNEY

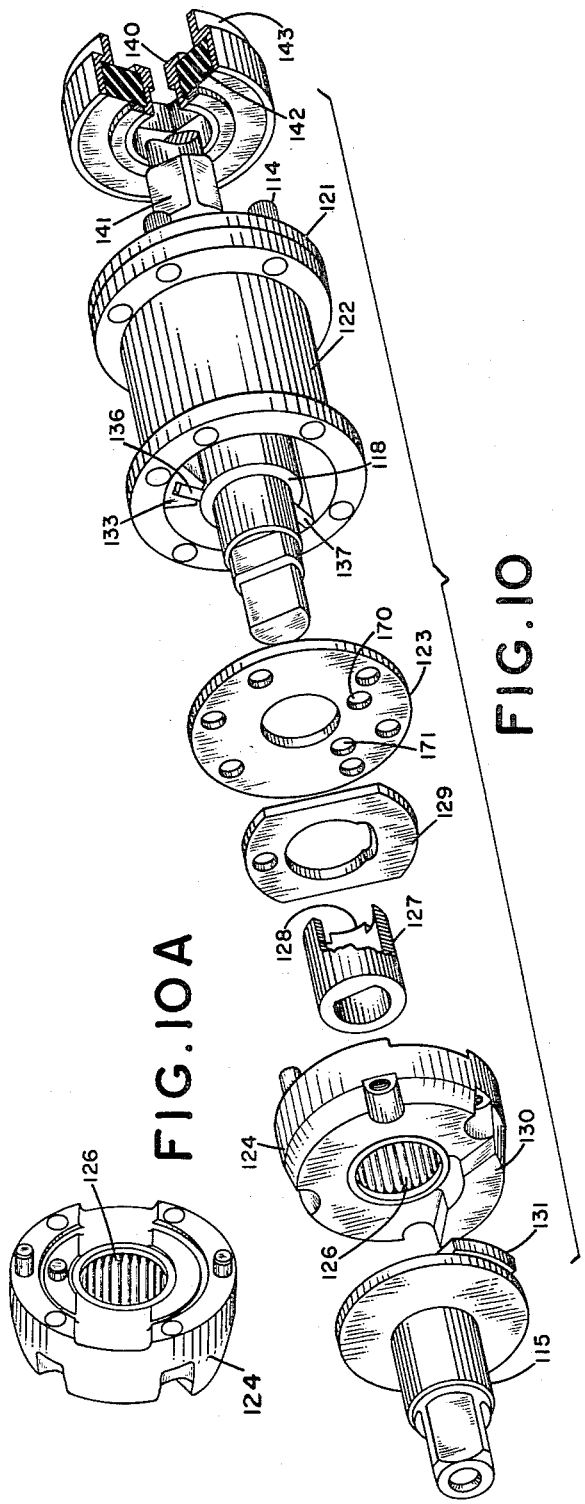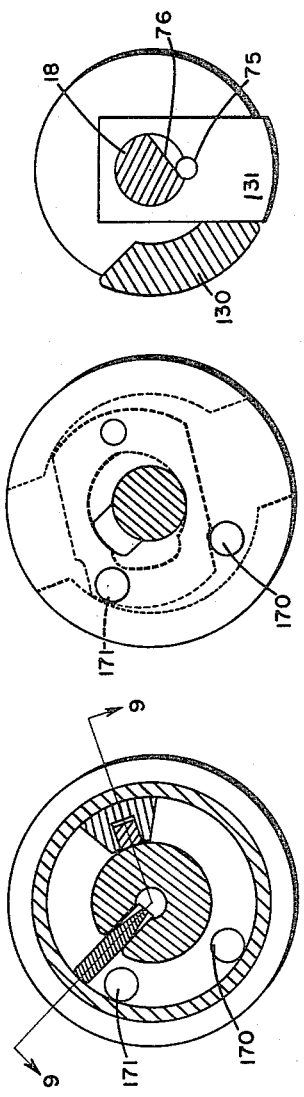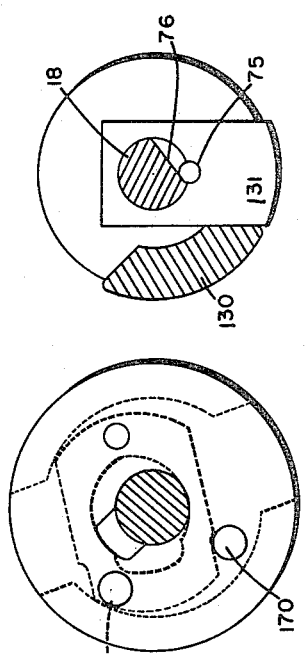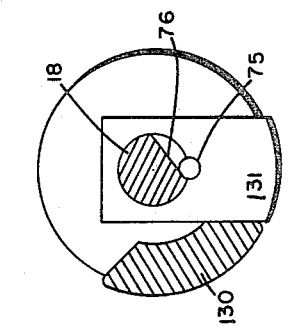

*INVENTOR.*
SPENCER B. MAURER
BY
*Eber J. Hyde*
ATTORNEY

United States Patent Office 3,169,585
Patented Feb. 16, 1965

3,169,585
POWER OPERATED ROTARY IMPACT TOOL
Spencer B. Maurer, Novelty, Ohio
(32145 Old South Miles Road, Solon, Ohio)
Filed Jan. 11, 1961, Ser. No. 81,693
20 Claims. (Cl. 173—93)

This invention pertains generally to a power operated rotary impact tool wherein unlimited rotation of the driven member in one direction is effected by limited oscillatory rotation of the motor, and more specifically to a rotary impact tool, such as a wrench, wherein a hammer is oscillated with respect to an anvil and the impact surfaces of the hammer and anvil are always in the same path of rotation.

This application is a continuation-in-part of my application Serial No. 806,619, filed April 15, 1959, for a Rotary Power Device, now abandoned.

An object of the present invention is to provide an impact wrench which can be pneumatically driven, and wherein the number of parts is kept to a minimum resulting in relatively inexpensive manufacture.

A further object of the present invention is to provide an impact wrench whose hammer and anvil jaws always lie in the same path of rotation so that the jaws are always in proper alignment for mating with each other, thereby obviating the difficulties which are prevalent in the prior art tools, namely chipping of the impact surfaces due to occasional mismating of the jaws and high wear rate of the jaws due to frictional forces as the jaws are pulled out of engagement with each other, and thereby to obviate many parts which were necessary in prior art tools to cause the disengaging motion of at least a portion of the hammer.

The above objects and advantages are shared with the tool shown, described and claimed in applicant's previous patent application, Serial Number 665,854, filed June 14, 1957, for a Rotary Impact Power Tool, now United States Patent 2,898,791, issued August 11, 1959.

In the tool shown in the mentioned patent there is an inside rotor member coupled to a separate hammer member, and there is an outside reaction member coupled loosely to the anvil member, and connected to the housing by means of an over-running clutch. All of the reaction torque from the reaction member is transmitted to the tool housing.

In the tools of the present invention the reaction member is the central shaft while the surrounding motor parts constitute the combined rotor-hammer assembly. In both of the embodiments as shown in FIGURES 1 and 9 the reaction shaft is connected to the tool housing by means of an overrunning clutch somewhat similar to the tool shown in the issued patent. However, in the embodiment shown in FIGURE 1 there is no lost motion between the reaction shaft and the anvil and there is, in addition to the overrunning clutch, an overload slip clutch between the reaction shaft and the housing. This clutch limits the amount of reaction torque which can be transmitted to the tool housing. In the embodiment shown in FIGURE 9, the reaction shaft is loosely coupled to the anvil similar to the tool of the issued patent, and the over-running roller clutch transmits all of the reaction torque from the reaction shaft to the tool housing.

The tools of the present invention have further objects and advantages which were not present in the patented tool. Among them are:

In the present tool the rotor member is the larger outside member of the motor and includes the hammer jaw as an integral part, thus utilizing the naturally massive motor member as the hammer, whereas in the tool shown in Patent 2,898,791 the rotor was located along the axis of the tool and it was necessary to add a heavy hammer member. Consequently, the present tool is smaller, lighter and less expensive to manufacture, yet is more powerful, efficient and durable.

A further advantage of the aforesaid reversed relationship in the masses of the motor members is a decided increase in the free run-down speed of the tool, due to the manner in which the bi-directional oscillating motor produces unidirectional rotation of the output shaft under free conditions.

The embodiment shown in FIGURE 1 is much more comfortable to hold and operate since the maximum amount of reaction torque which can be applied to the handle is definitely limited to a relatively low degree by an overload slip clutch. This clutch in combination with the overrunning spring clutch provides sufficient resistance to backward motion of the reaction shaft relative to the housing to establish a net forward rotation of the output shaft in the desired direction under free rundown conditions. However, once the work being tightened has been seated and has attained a relatively modest degree of tightness, backward motion of the reaction shaft is prevented since it is directly coupled to the work through the output shaft. Thus the full power output is realized and the bulk of the reaction torque is taken by the work itself.

For a better understanding of the present invention, together with other and further objects thereof, reference is had to the following description taken in connection with the accompanying drawings, and its scope will be pointed out in the appended claims.

With reference to the drawings:

FIGURE 1 shows a cross-sectional view taken longitudinally through a tool which embodies one form of the invention;

FIGURE 1-A is an enlarged view of the rear portion of the tool, particularly showing the manual reversing mechanism, and with the tool manually set for reverse operation;

FIGURE 1-F shows by an enlarged view the manual reversing mechanism in the forward position; and FIGURE 1-R shows the manual reversing mechanism in the reverse position.

FIGURE 3 is a sectional view taken along line 3—3 of FIGURE 1-A, showing the overrunning spring clutch.

Figure 4:
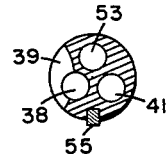

FIGURE 4-R is a sectional view somewhat similar to the sectional view of FIGURE 4, but showing the relationship of parts for reverse operation.

Figure 1:
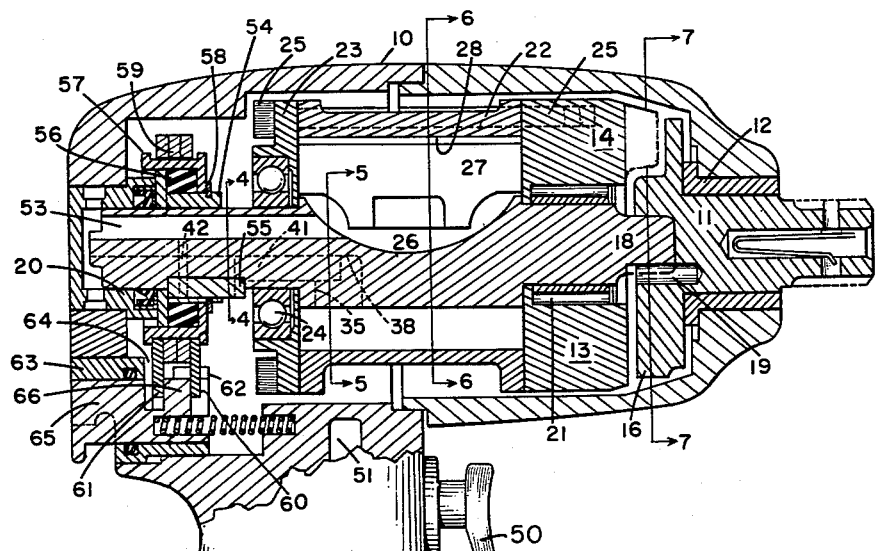
Figure 5:
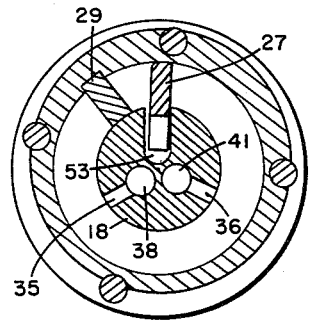

FIGURE 5 is a sectional view taken along line 5—5 of FIGURE 1, and showing the automatic air inlet control valve.

Figure 6:
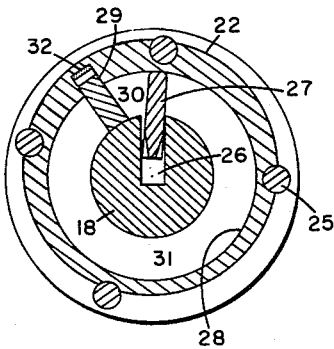

FIGURE 6 is a sectional view taken along line 6—6 of FIGURE 1, and showing the motor.

Figure 7:
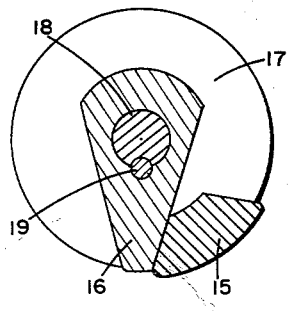

FIGURE 7 is a sectional view taken along line 7—7 of FIGURE 1 and showing the impacting jaws.

Figure 8:
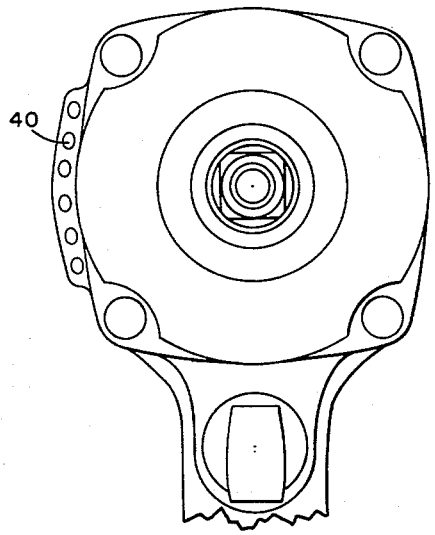

FIGURE 8 is a view looking at the front of the tool.

FIGURES 9 to 16 relate to a second embodiment of the tool.

Figure 9:
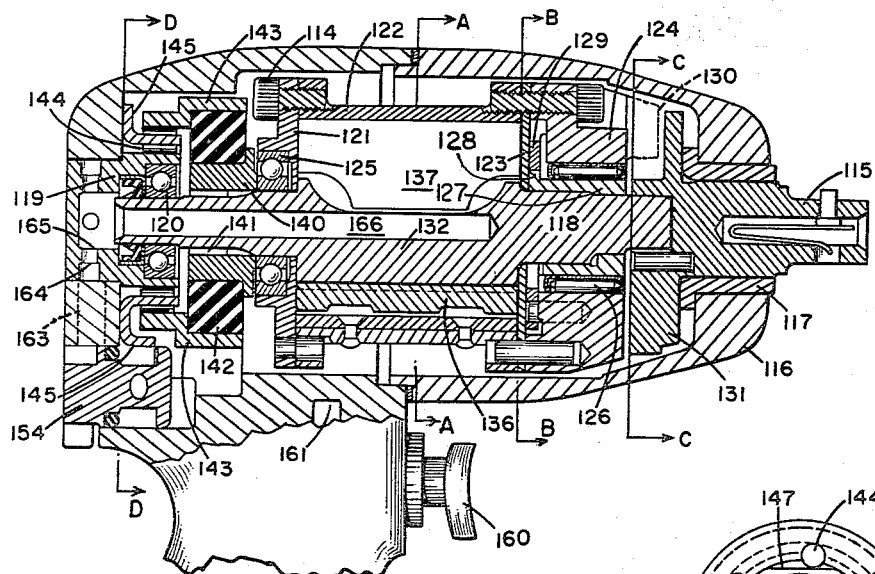

FIGURE 9 is a longitudinal section through the center of the tool.

FIGURE 10 is an exploded view of the parts of the tool with the housing removed.

FIGURE 10-A is a view of a portion of the tool from another direction.

Figure 11:
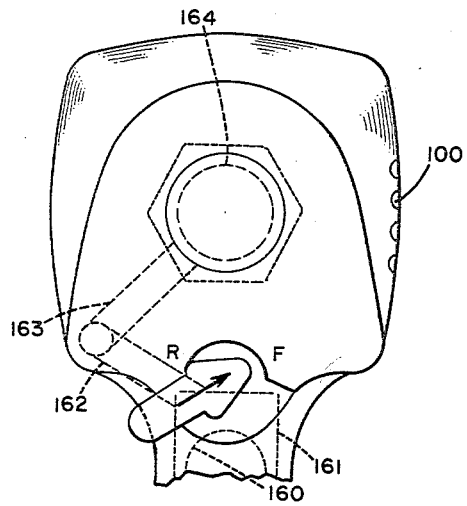
Figure 12D:
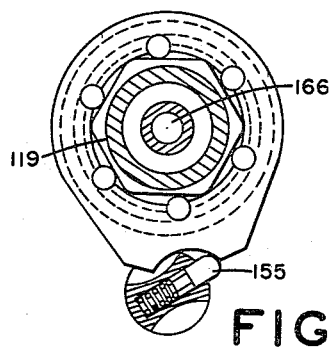
Figure 12A:
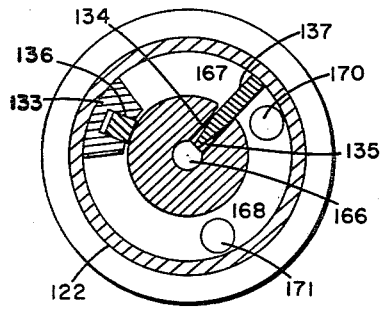
Figure 12B:
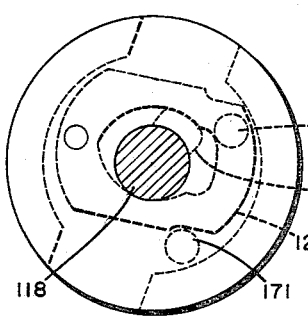
Figure 12C:
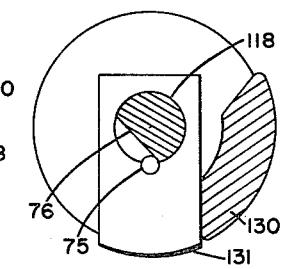

FIGURE 11 is a rear view of the tool.

FIGURES 12-A, B, C, and D are sections through the tool along lines A—A, B—B, C—C, and D—D, of FIGURE 9, showing the correct relationship of the parts at impact in a forward direction.

Figure 13A:
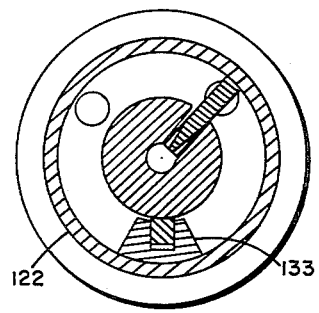
Figure 13B:
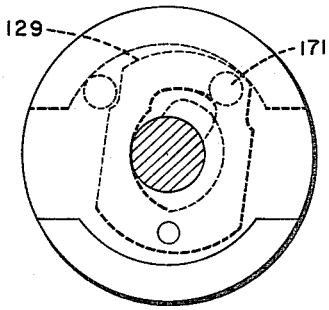
Figure 13C:
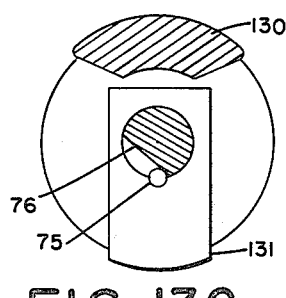

FIGURES 13-A, B, and C show the conditions an instant after impact when the hammer has retracted more than half way.

Figure 14A:
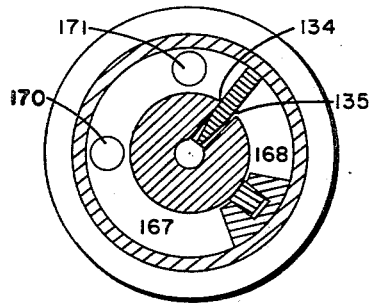
Figure 14B:
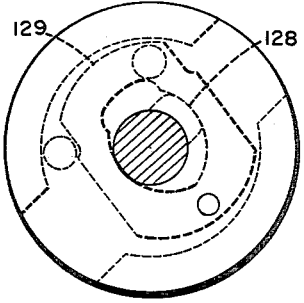
Figure 14C:
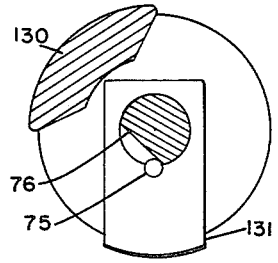

FIGURES 14-A, B, and C show the conditions at a later point in the rotary cycle.

Figure 15A:
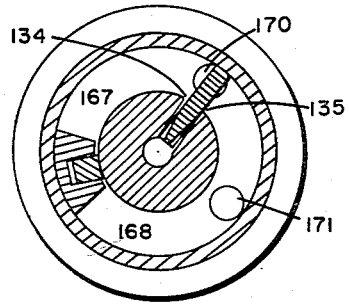
Figure 15B:
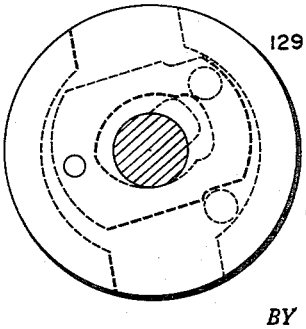
Figure 15C:
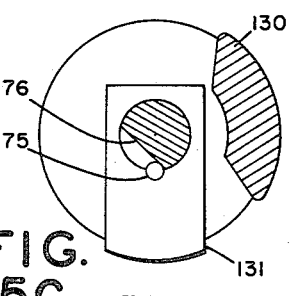

FIGURES 15-A, B, and C show the parts as the hammer approaches the jaw to strike another blow.

Figure 16D:
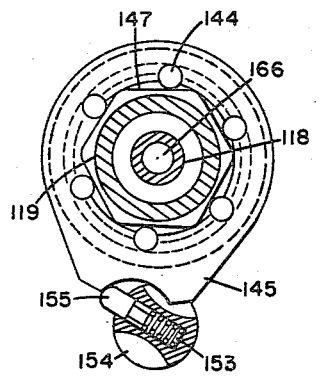

FIGURES 16-A, B, C, and D show the sections at impact in the reverse direction.

An aspect of the present invention lies in the provision of a rotary power device such as an impact wrench or the like, which preferably is pneumatically driven, and wherein there is a housing with output shaft means including impact receiving surface means mounted in the housing for rotation with respect thereto. A motor reaction member means is mounted within the housing for rotation with respect thereto, and is coupled to the output shaft. Together the reaction member means and the output shaft may be called the central shaft reaction member means. Preferably the impact receiving surface means is on the output shaft because of ease of assembly, but it could be on the reaction member means instead, since the two are coupled together.

Clutch means including an overload slip clutch and an overrunning spring clutch connect the reaction member means to the housing to allow unrestrained motion of the reaction member means in the direction of operation of the tool and to apply a limited restraining torque to its motion in the opposite direction. Massive rotor means are provided, including impact delivering surface means, mounted for rotation within the housing. Motor means apply torque to the rotor means and to the reaction member means to establish limited rotation therebetween in either direction. Automatic reversing means including rotary position valve means is associated with the reaction member means and the massive rotor means to periodically reverse the direction of the motor torque to cause the rotor means to oscillate relative to the reaction member means so that as the rotor means approaches either extreme of relative oscillation the motor torque reverses so as to oppose further approach. The above rotary position valve means includes biasing means so that, for forward operation of the tool, the impact delivering jaw more closely approaches the impact receiving jaw in a forward direction than in the reverse direction before the motor torque reversal occurs, to deliver an impact blow in the forward direction.

Manual reversing means are provided to control the direction of operation of the tool and include means to reverse the above mentioned biasing means and the direction of free motion of the above mentioned overrunning clutch.

With reference to FIGURE 1, the rotary device of this invention comprises a housing 10 having an output shaft 11 journaled in the forward end of the tool by the sleeve bearing 12. A massive rotor means, indicated generally by the reference character 13, is mounted for rotation in the forward end of the tool, and comprises a hammer 14 having an impact delivering jaw 15 always in the same path of rotation as an impact receiving jaw 16 mounted on an anvil member 17. The forward end of a centrally mounted reaction shaft 18 is mounted in and is keyed to the anvil member 17 by means of a locking pin 19, constraining them both to rotate effectively as a unit. The rearward end of the reaction shaft 18 is mounted by means of a bushing 20 in the housing 10.

The massive rotor means 13 is mounted around the reaction shaft 18 by means of roller bearing 21 at the forward end, and includes a cylindrical portion 22 the bore of which is concentric around the axis of the tool, and a rear end plate 23 which closes the rear end of the air motor and provides a support for bearing 24. The forward end of the air motor is closed by the massive hammer means 14 which also serves as the forward end plate. Bolts 25 extend through the end plate 23, the cylindrical portion 22 and into the massive hammer means 14, securing all of these parts together to form the rotor means 13.

As shown in FIGURE 1, the reaction shaft 18 has a radial slot 26 in which is tiltably positioned an inlet valve vane 27, and the outside edge of the vane 27 slidingly contacts the bore 28 of the cylindrical portion 22 of the motor. An exhaust valve vane 29 is mounted in a radial slot in the cylindrical portion 22 and its inside edge slidingly contacts the outside surface of the reaction member 18. A leaf spring 32 biases the vane 29 toward the reaction member 18. Thus the two vanes 27 and 29 divide the annular motor chamber into two portions 30, 31.

FIGURE 5 shows the automatic reversing means which is comprised of the exhaust valve vane 29 and one or the other of exhaust ports 35, 36. During forward operation of the tool, later to be described, vane 29 rotates past the exhaust port 35, thereby sealing off chamber 31 and causing chamber 30 to exhaust through port 35 to atmosphere. Exhaust port 36 is similar to exhaust port 35 but is used during the loosening of a nut whereas port 35 is used during tightening of a nut. Exhaust port 35 communicates with a bore 38 extending rearwardly through the reaction member 18 to a point where the bore 38 communicates with port 39 (FIGURE 4) to exhaust the air into the tool housing, holes 40 (FIGURE 8) being provided to exhaust the air to atmosphere. During forward operation of the tool (FIGURE 1-F) the reverse exhaust port which communicates with bore 41 and port 42 is closed by the hub 54.

Figure 2:
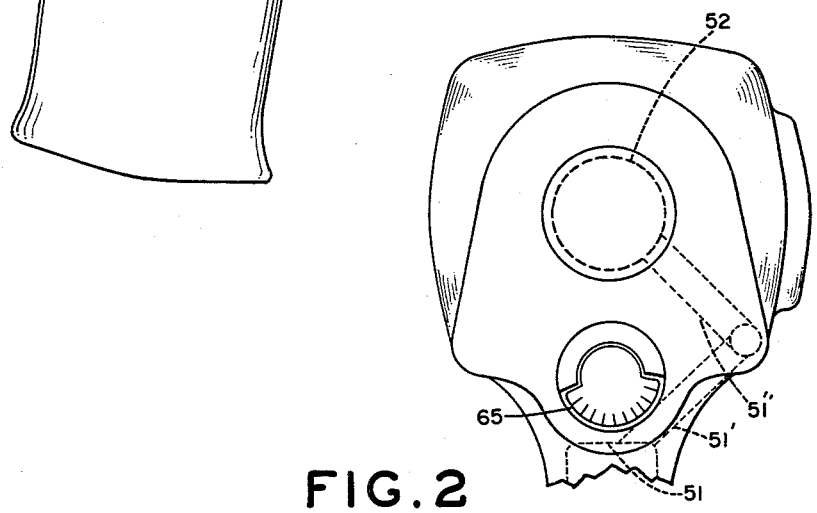
FIGURE 2 is a rear view of the tool.
Figure 1A:
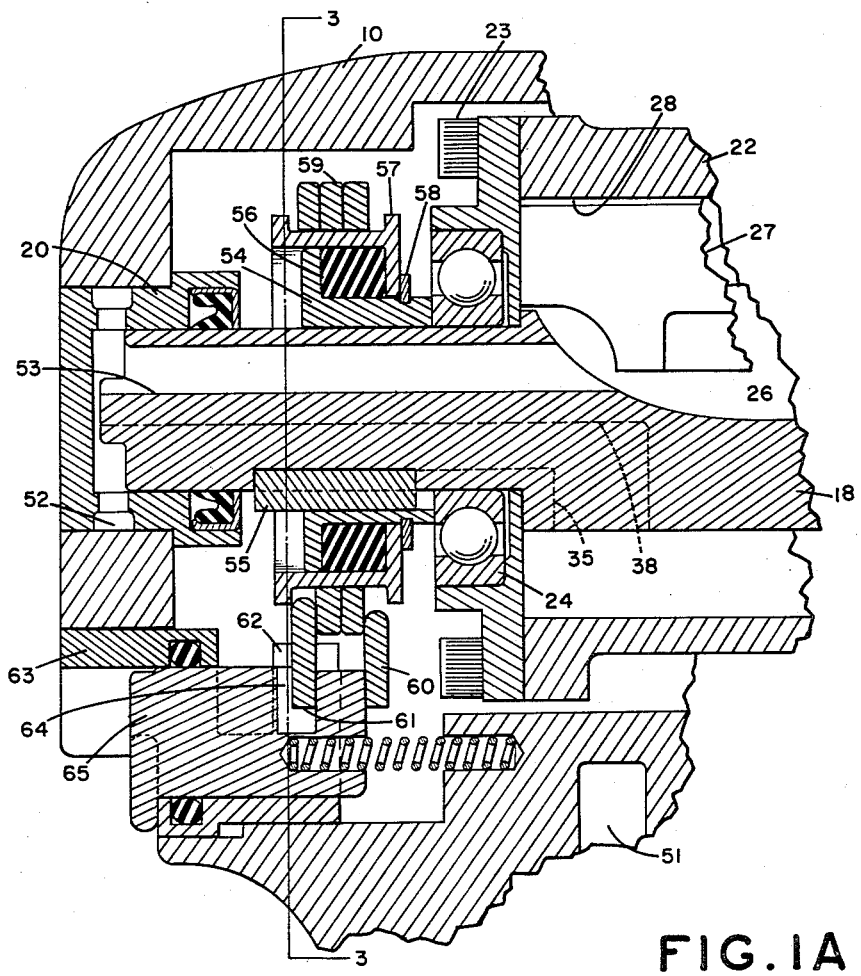
Figure 4R:
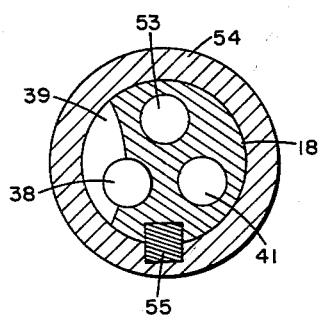
FIGURE 4 is a sectional view taken along line 4—4 of FIGURE 1, showing an exhaust port arrangement.

Air is admitted to the tool upon manual operation of the throttle valve 50 (FIGURE 1), through cored passageway 51 to passageway 51' and passageway 51" to a groove 52 (FIGURE 2) around the outside of the bushing 20, then through inlet bore 53 (FIGURE 1) to the base of the inlet valve vane 27.

An inner hub 54 is slidably keyed to the reaction member 18 by key 55, and it frictionally engages the neoprene ring 56. A drum member 57 surrounds the neoprene ring 56 and is in frictional engagement with it. These are held together with a preload force by snap ring 58. These aforesaid parts comprise an overload slip clutch. Mounted on the periphery of the drum 57 is an overrunning spring clutch 59. The forward end 60 of the spring 59 is confined in a longitudinal slot 62 in a bushing 63, and the rearward end 61 of the spring 59 is free to move slightly in a circumferential direction in clearance groove 64. Thus since overrunning spring clutch 59 is coiled in a right hand direction, the hub 57 is free to turn clockwise but is restrained from counterclockwise motion. The forward portion 66 of a manually operated reverse button 65 is positioned between the forward and reverse ends 60, 61 of the spring clutch 59 and is in engagement with them so that as the reverse button 65 is pushed inwardly the forward portion 66 pushes the forward end of the spring 60 and consequently moves forward the entire overload slip clutch comprised of the hub 54, ring 56, drum 57, and overrunning spring clutch 59. The neoprene ring 56 between the inner hub 54 and the drum member 57 serves as an overload slip clutch. As the overload slip clutch 56 and the overrunning spring clutch 59 move forward the forward spring end 60 is no longer held in the confines of slot 62, and rearward end 61 moves into slot 62. Thus reversing the action of the overrunning spring clutch 59. At the same time exhause port 39 in the shaft is sealed off by the inner hub 54, and exhaust port 42 is opened up.

The drawings illustrate the position of the several parts of the tool at the instant of impact to tighten a nut, in the forward direction. The axial position of the slip clutch assembly 54, 56, 57 as shown in FIGURES 1 and 3 is such as to close the exhaust port 36 and the overrunning clutch spring 59 allows only forward rotation of the drum 57. The tilting inlet valve vane 27, leaning to the right as shown in the drawing (FIGURES 5 and 6), admits live air from conduit 53 to portion 30 of the motor chamber, while at the same time portion 31 of the motor chamber is connected to atmosphere by exhaust port 35, bore 38, port 39, and holes 40. High air pressure in motor chamber 30 imposes a counter-clockwise torque through vane 29 to cylinder 22 to the rotor assembly 13 until the exhaust valve vane 29 passes the exhaust port 35, at which time motor chamber 30 is connected to atmosphere via exhaust port 35, and thereafter motor chamber 31 is sealed off. Inlet valve vane 27 is then shifted to a left-hand tilt position due to drop in air pressure in chamber portion 30 and rise in an air pressure in chamber portion 31 caused by compression of this chamber as the rotor unit 13 coasts due to its kinetic energy in a counter-clockwise direction. This valve vane shift is aided by frictional forces between the vane 27 and the cylinder wall 22 which it contacts.

The result of the valve vane shift is to further increase the pressure in chamber portion 31 by opening motor chamber portion 31 to live air in the radial slot 26, thus creating a clockwise torque through vane 29 on the cylinder 22, which decelerates rotor assembly 13 in its backward motion and accelerates it in a forward direction until exhaust valve vane 29 again passes exhaust port 35. At this time the motor torque on the motor assembly is again reversed but due to the kinetic energy in the massive rotor assembly 13 the impact jaw 15 contacts the anvil jaw 16, thus delivering an impact blow in a forward or clockwise direction before appreciable energy is lost.

Another cycle begins as the rotor assembly rebounds backwards and is also driven backward by motor torque due to pressure in motor chamber portion 30. Pressure in chamber 30 not only creates a backward torque on rotor assembly 13 but also a forward or clockwise torque on reaction shaft member 18. This torque tends to tighten the work through output shaft 11 but is too weak to be effective after the first few impact blows have been struck. When the exhaust valve vane 29 passes exhaust port 35 as the rotor assembly turns backwards and the valve shift occurs, the direction of torque on the reaction member is reversed and becomes counter-clockwise or backwards which has a tendency to loosen the work being tightened. However, since the maximum motor torque is so small in comparison to the normal output of the impact mechanism, the work cannot be loosened by this torque after the first few impact blows have been struck. Since the torque transferred to the housing is limited by the overload slip clutch 54, 56, 57 to a much lower value than the maximum motor torque, the operator feels very little of the reaction torque, most of it being taken by the work itself. During the rundown operation before the nut is firmly seated, the backwards torque of the reaction shaft 18 is resisted by the frictional torque of the overload slip clutch 56, through the overrunning spring clutch 59. The frictional torque of the overload slip clutch 56 is sufficient to cause a net forward motion of the output shaft 11 during free run-down operation, but by itself would be inadequate for full power output during normal impact operation. Thus this arrangement has the advantage of full power output under impact operation with very little reaction torque transferred to the tool operator.

During free run-down operation, when there is relatively little externally applied resistance to rotation of the output shaft 11, it has been found that a higher speed of rotation is attained by a tool of the type herein disclosed than by the tool disclosed in Patent 2,898,781, previously mentioned. Also, there is considerably less wear and tear on the parts in this type of operation. While the action of the two tools is similar under normal impact operation there is considerable difference under free operation. This fundamental difference is due to the reversal in the relationship of the masses of the rotor and the reaction member.

In the tool of U.S. Patent 2,898,791, the moment of inertia of the reaction member is larger than that of the combined rotor and hammer assembly. Thus the motion or stroke of the reaction member is quite small for each impulse as the lighter member acquires the greater share of the motion. The stroke of the rotor-hammer assembly relative to the reaction member is the same as under impact operation and the major forward motion of the reaction member is caused by the impact blow.

However, in a tool of the type herein described, the moment of inertia of the reaction member is considerably less than that of the rotor hammer unit. As a result, the forward motion of the reaction member is considerably greater for each impulse than in the other tool. Also the energy imparted to the rotor-hammer unit in a backward direction during this impulse is much less and under certain conditions is zero as this unit acquires a continuous but varying forward momentum. Thus the total relative stroke remains the same but the motion of the motor members relative to the tool housing is essentially in a forward direction only. This results in a much higher speed of rotation of the output shaft and a reduction in the severity of any impacts which may occur during this pre-rundown operation.

The tool shown in FIGURES 9 through 16 differs from the tool shown in FIGURES 1 through 8.

In the embodiment of the invention shown in FIGURES 9 through 16 an output or anvil shaft 115 extends through the forward end of a housing 116 and is journaled there in a bushing 117. A reaction shaft 118 is journaled on its forward end in the anvil shaft 115 and is adapted for limited rotary motion of approximately 80° relative to the anvil shaft 115 by a locking or drive pin 75 engaging a flat surface 76 on the reaction shaft 118. The reaction shaft 118 is supported at the other end by a rear bushing 119 and a ball bearing 120. A rotor assembly comprises a rear end plate 121, a cylinder 122, a front end plate 123, and a hammer 124, all rigidly bolted together by bolts 114 to act as a massive hammer element. This assembly is supported on the reaction shaft 118 by a ball bearing 125 mounted in the rear end plate 121 and by an antifriction needle bearing 126 mounted in the hammer 124. Bearing sleeve 127 is keyed to the reaction shaft 118 and includes a driving lug 128 which operates an exhaust valve plate 129 with a lost motion cam action.

The hammer 124 includes an impact delivering jaw 130, and the anvil shaft 115 includes an impact receiving jaw 131. These jaws always lie in the same path of rotation and permit approximately 220° of relative motion. The rotor assembly surrounds a central portion 132 of the reaction shaft 118 forming an annular motor cavity which is divided into two pressure-tight portions 167, 168 by the longitudinal rotor vanes 136 and 137. The rotor vane 136 is mounted in a shoe 133 riveted to the inside of cylinder 122 and slidingly contacts the outside of reaction shaft 118. Shaft vane 137 is mounted in a slot 135 in the reaction shaft 118 and slidingly contacts the bore of cylinder 122. The end plates 121 and 123 sealingly contact the ends of the vanes 136 and 137, the ends of the cylinder 122 and the central portion 132 of the reaction shaft 118 to define the two motor chambers 167 and 168. Maximum relative rotary motion of the motor parts is approximately 300° from one extreme to the other. The front end plate 123 has extending through it two exhaust holes 170, 171, approximately equidistant angularly from the rotor vane 136 which cooperate with exhaust valve plate 129 to form the exhaust valve.

The reaction shaft 118 is keyed to a hub 140 by means of a square connection 141. A rubber member 142 has a tight frictional fit on the O.D. of hub 140 and on the I.D. of a clutch sleeve 143 to form an overload slip clutch in the drive connection between the reaction shaft 118 and roller clutch sleeve 143. The rear portion of clutch sleeve 143 has a bore which contacts clutch roller members 144 of the roller clutch assembly. A roller cage 145 retains the clutch roller members 144 and keeps them in their proper position relative to the flats of the hexagonal section 147 on the outside of inlet bushing 119. The inlet bushing 119 is press-fitted into the back portion of the housing 116. A biasing spring 153 is mounted in a reverse lever 154 and exerts force on a button 155 which in turn biases the roller cage 145 either to the right or to the left depending on the desired direction of rotation. For forward operation of the tool, button 155 exerts a counter-clockwise torque on roller cage 145 as shown in FIGURE 12–D with the reverse lever 154 in the position shown in FIGURE 11. Thus the reaction shaft 118 through frictional engagement with clutch sleeve 143 is restrained from backward, or counter-clockwise rotation but is allowed to turn freely in a forward or clockwise direction. In this tool the overload slip clutch, comprised of hub 140, rubber 142, and clutch sleeve 143 serves only as a safety device and transmits the full motor torque to the housing.

To reverse the direction of operation of the tool, reverse lever 154 is rotated counterclockwise so that the spring 153 exerts a pressure through button 155 on roller cage 145 in a clockwise direction, as shown in FIGURE 16–D, so that reaction shaft 118 is allowed to turn freely in a reverse or counter-clockwise direction but not in the forward direction.

Air is admitted to the tool through throttle 160 to port 161 and from port 161 the air flows backwards through tubular port 162 to the rear end of the tool and then radially inward through port 163 to a groove 164 in rear bushing 119. The air then flows radially inward through drilled ports 165 to the central bore 166 of the inlet bushing and axially forward through central bore 166 of reaction shaft 118 to the bottom of shaft vane 137, thence radially outward between vane 137 and the side of the slot 135 in shaft 118 into one or the other of the motor chambers 167 and 168 depending upon the position of vane 137. The vane position depends upon which of chambers 167 and 168 is vented by one or the other of exhaust ports 170, 171. In FIGURE 12–A air is being admitted to chamber 167 between vane 137 and the edge 134 of slot 135. Chamber 168 is vented to atmosphere through exhaust port 171 and holes 100 in the front housing. Exhaust port 170 is closed by plate valve 129 as shown in FIGURE 12–B. Pressure in chamber 167 creates a counter-clockwise torque on the rotor assembly and a clockwise torque on the reaction shaft. Pressure in chamber 168 would provide the opposite torques on these members.

The shaft vane 137 acts as a remotely controlled pressure sensitive valve to divert the live air supply to whichever of the two motor chambers is best able to retain it. Since one or the other of the exhaust ports 170, 171 is always open, the live air is always diverted to the smaller of the two motor chambers when the rotor unit is approaching either extreme of its stroke relative to the reaction shaft. When the rotor is near the center of its stroke relative to the shaft (the exhaust holes 170, 171 straddle the shaft vane 137) the air may be diverted to either one of the motor chambers, depending on the position of the exhaust valve plate 129, but not to both due to the inherent instability of the inlet valve vane 137 when in a mid-position in the slot 135 of shaft 118. Thus the rotor unit tends to oscillate about its mid position relative to the reaction shaft. The inertia of the rotor unit, the lost motion between valve plate 129 and driving lug 128, and the remote operation of the inlet valve vane 137 all cooperate to insure this action regardless of the air pressure supplied.

Impact action of the rotor hammer unit 124 in one direction only on the anvil jaw 131 is obtained by causing the reaction shaft 118 to be biased in this same direction (toward this anvil jaw) an amount equal to one half the difference between the maximum possible strokes of the motor unit and of the impact jaws, by the motor torque when effective in this direction. Motion of the reaction shaft in the opposite direction under reverse motor torque is prevented by the roller clutch 144, 147.

From this it can be seen that the effective operation of this tool depends upon the maintenance of the reaction shaft in its properly biased position relative to the anvil jaw.

Every impact blow on the anvil drives the anvil forward relative to the reaction shaft in effect moving the reaction shaft out of its properly biased position. To restore the correct bias the motor torque must overcome the frictional torque of the overrunning clutch in the slip direction and move the shaft ahead again to its proper position before the rotor unit, rebounding at high velocity from the anvil and being aided by motor torque, has reached the valve shift position. Low moment of inertia of the reaction shaft and low frictional resistance of the overrunning clutch, in the slip direction, are essential to proper rebiasing and therefore to proper operation of the tool.

The design of the oscillating impact wrench shown in my Patent No. 2,898,791 employs a different structure which has a massive reaction member surrounding a central shaft rotor member and a reversible spring clutch of inherently high frictional slip torque for the overrunning clutch means. The present design is a great improvement over the original due to the greatly reduced moment of inertia of the reaction member and the reduced friction of the overrunning roller clutch in the slip direction.

In operation, with the parts arranged as shown in FIGURES 12–A, B, C, and D, air is admitted to chamber 161 by depressing throttle button 160. From chamber 161 the air flows to the rear of the tool through port 162 and then radially to the center of the tool at the rear end through passage 163 to groove 164 in the rear of inlet bushing 119, thence through ports 165 to the central bore 166 of the central reaction shaft member 118. The air then flows forward to the area immediately under vane 137 which is mounted in the slot 135 in central shaft 118. The air then escapes radially outward between the vane and the sides of this slot either through clearance 134 on one side or 135 on the other side into motor chambers 167 and 168 respectively. Since chamber 168 is connected to atmosphere through exhaust hole 171 in the forward end plate 123 the pressure in this chamber does not rise appreciably while the pressure in chamber 167 which is not connected to atmosphere rises appreciably and tilts vane 137 in a clockwise direction, thus effectively sealing off the passageway 135 and exerting a clockwise torque on the central reaction shaft member. Since the reverse lever 154 is set for forward operation as shown in FIGURE 12–D, the roller cage 145 is being held in a counterclockwise direction by spring 153 and button 154, allowing clutch sleeve 143 to rotate only in a clockwise direction, and since the central shaft 118 is effectively connected to this member the central shaft can rotate only in a clockwise direction. The central shaft can rotate clockwise only until the flat 76 on the forward end of the central shaft 118 comes in contact with drive pin 75 mounted in the anvil shaft 115. The forward torque on the shaft 118 is thus transferred to the anvil 115 which during forward impact operation is restrained from forward motion by the work being tightened. The shaft is thus biased in a clockwise direction relative to the anvil jaw to the limit allowed by drive pin 75. Since the roller clutch prevents backward motion of the shaft, the shaft 118 tends to remain in this position relative to the anvil jaw as long as the reverse lever is set for forward operation. Pressure in chamber 167 at the same time exerts a counterclockwise force on vane 136 which is mounted in the rotor assembly. Thus, as the rotor assembly turns in a counterclockwise direction the exhaust valve plate 129 moves up against lug 128 which causes the valve plate 129 to be shifted to the position shown in FIGURE 13–B. Since lug 128 is keyed to shaft 118 the timing of the shift of the valve plate is dependent upon the rotary position of the rotor assembly relative to the central shaft. The shift of the valve plate closes port 171 in the front end plate and opens port 170. Thus motor chamber 167 is vented to atmosphere and chamber 168 is sealed. The rotor assembly, however, continues to coast in a counterclockwise direction due to kinetic energy which has been stored in it until it reaches the position shown in FIGURE 14-A. At this time, due to compression of air in chamber 168, the pressure has increased in this chamber and due to the elapsed time the compressed air in chamber 167 has had time to escape out of exhaust port 170 so that the side pressure forces on vane 137 are now unbalanced in a counterclockwise direction causing a shift of the vane, and the passage 134 is sealed and passageway 135 is opened, thus admitting live air directly to chamber 168 further applying a counterclockwise torque on central reaction shaft member 118 and a clockwise torque on the rotor assembly. The central reaction shaft member 118 is restrained from moving in a counterclockwise direction by the rollers 144 of the roller clutch assembly. The rotor assembly, however, will continue to coast an additional amount in a counterclockwise direction until all of the kinetic energy has been absorbed and the rotor assembly is then started in a return clockwise direction. This forward or clockwise rotation of the rotor assembly continues until the exhaust port 170 is again closed and port 171 opened as the exhaust valve shifts just before the impact blow is struck as shown in FIGURES 15-A and B and C. The pressure in motor chamber 167 now begins to increase due to compression as the rotor assembly continues to travel toward the impact position. The pressure in motor chamber 168 at the same time is dropping and before the impact blow is struck the valve vane 137 is again shifted to the other side of the slot so that passageway 135 is closed and passageway 134 is opened to rapidly build up pressure in motor chamber 167 thus again reversing the direction of the motor torques. Before appreciable kinetic energy is lost the impact blow is struck, driving the anvil forward (out of bias) and causing the rotor hammer assembly to rebound in a counter-clockwise direction in which action it is aided by motor torque. At the same time the motor torque on the reaction member drives the shaft in a clockwise direction until flat 76 again contacts drive pin 75 in anvil 115 as the correct bias relationship is re-established and another cycle has begun.

To operate the tool in reverse the reversing lever is shifted counterclockwise and the spring biased button 155 assumes the position shown in FIGURE 16-D. In this position the roller cage is biased in a clockwise direction which prevents any clockwise motion of the clutch member 143 but allows counterclockwise motion. The FIGURES 16-A, B, and C show the arrangement of the parts just at the moment of impact in a reverse direction. The central shaft 118 as shown in FIGURE 16-C is biased in a counterclockwise direction relative to the anvil shaft 115 in which position it tends to remain for reverse operation. This changes the rotary relationship of the reaction shaft 118 relative to the anvil jaw 131 so that as the rotor assembly oscillates relative to the reaction shaft in the same fashion as before, the hammer strikes the impact blow at the other end of its stroke, thus impacting in a counterclockwise or reverse direction.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A rotary impact tool comprising, in combination, a housing, motor means mounted within said housing and including central reaction member means and including massive rotor means surrounding at least a portion of said reaction member means and mounted concentrically thereon for limited rotary motion in respect thereto, hammer means coupled to said rotor means, output shaft means having an anvil always meshed with a portion of said hammer means and capable of relative lost motion in respect thereto, and automatic reversing means to cause said hammer to oscillate with respect to said anvil and deliver a series of blows in one direction to the anvil.

2. In a rotary driving power device, an output shaft including an anvil adapted to apply to a workpiece both a rotary driving force and an intermittent holding torsional force, a housing; a motor mounted within said housing and including reaction member means to alternately apply said intermittent torsional force to said output shaft, and rotor means mounted around at least a portion of said reaction member means for limited rotary motion in respect thereto and for rotation in respect to said housing to apply to said output shaft a rotary driving force, said rotor means including a hammer always in the path of rotation of said anvil.

3. In a rotary impact device as set forth in claim 2, further characterized by overrunning clutch means connected between said housing means and said reaction member means to allow said reaction member means to rotate in one direction only relative to said housing.

4. A rotary impact power device comprising, in combination, a housing, a motor within said housing including a central reaction member means mounted for rotation with respect to said housing and massive rotor means surrounding at least a portion of said reaction member means and mounted thereon for limited motion in respect thereto; automatic reversing means associated with one of the aforesaid means to impart oscillatory rotation between said rotor means and said reaction member means, an overrunning clutch mounted between said housing and said reaction member means to restrict the motion of the reaction member means relative to said housing effectively to one direction, an output shaft mounted in said housing for rotation and in alignment with said reaction member means, and first limited lost motion means coupling said output shaft to said reaction member means with a limited degree of lost rotary motion therebetween for causing said output shaft to rotate in the said one direction.

5. A rotary impact power device as set forth in claim 4, further characterized by said overrunning clutch being reversible, and other reversing means for acting on said overrunning clutch to cause said reaction member means to rotate effectively in the reverse direction relative to said housing when so reversed.

6. A rotary impact power device as set forth in claim 4, further characterized by said massive rotor means comprising a hammer and said output shaft comprising an anvil, second limited lost motion means interconnected between said rotor means and said output shaft to allow said hammer means to deliver a series of impact blows to the anvil in the same direction of rotation as the reaction member means is urging the anvil.

7. A rotary impact power device as set forth in claim 6, further characterized by said overrunning clutch being reversible, and other reversing means for acting on said overrunning clutch to cause said reaction member means to rotate effectively in the reverse direction relative to said housing when so reversed.

8. In a rotary impact power device, a housing, massive rotor means mounted within said housing for rotation with respect thereto, reaction member means mounted within said massive rotor means and substantially on the longitudinal axis of said housing for rotation with respect thereto, said rotor means and said reaction member means being mounted for limited rotation with respect to each other, a motor acting on said rotor means and said reaction member means to establish rotation therebetween, automatic reversing means associated with at least one of the aforesaid means to impart oscillatory rotation between said rotor means and said reaction member means, an overrunning clutch mounted between said housing and said reaction member means to restrict the motion of the reaction member means relative to said housing effectively to one direction, and an output shaft in driving engagement with said reaction member means for causing said output shaft to rotate in the said one direction.

9. A rotary impact power device comprising, in combination, a housing, reaction member means mounted within said housing substantially on the longitudinal axis thereof for rotation with respect thereto, massive rotor means surrounding at least a portion of said reaction member means and including two end plates defining an annular chamber between the massive member means and the reaction member means, a pair of vanes one connected to the massive rotor means and slidingly contacting the reaction member means and the other connected to the reaction member means and slidingly contacting the massive rotor means to divide the said annular chamber into two parts, exhaust port means in one of the aforesaid means and cooperating with the vane connected to the other of the aforesaid means to exhaust at least one of the two portions of the said annular chamber to atmosphere, means for supplying air under pressure to said chamber, either one of said two vanes being tiltable with respect to the means to which it is connected for directing said air supply to either one of said two portions of said annular chamber in order to establish oscillatory rotation between said reaction member means and said massive rotor means, and an output shaft including impact receiving surface means connected to said reaction member means, and impact delivering surface means connected to said massive rotor means for delivering an impact blow on said impact receiving surface means.

10. A rotary impact power device comprising, in combination, a housing, output shaft means including impact receiving surface means mounted in said housing for rotation with respect thereto, centrally mounted reaction member means mounted within said housing for rotation with respect thereto and substantially directly coupled to said output shaft, massive rotor means including impact delivering surface means mounted within said housing for rotation with respect thereto, motor means for applying torque to said rotor means and said reaction member means to establish rotation therebetween in either direction, automatic reversing means including rotary position valve means associated with at least one of the aforesaid reaction member and massive rotor means so that the direction of the application of the torque is dependent upon the relative rotary positions of the impact receiving and impact delivering surface means for delivering an impact blow in one direction.

11. A rotary impact power device as set forth in claim 10, further characterized by manually operable reversing means acting on said rotary position valve means to reverse the direction of said impact blow.

12. A rotary impact power device as set forth in claim 10, further characterized by overrunning clutch means mounted between said reaction member means and said housing, said clutch means allowing said reaction member means to rotate freely in the direction of the impact blow, and imposing a frictional drag on said reaction member means when said reaction member means tends to turn in the opposite direction.

13. A rotary impact power device as set forth in claim 12, further characterized by said overrunning clutch means including an overrunning clutch and an overload slip clutch to limit the maximum amount of torque reaction transferred to said housing.

14. A rotary impact power device comprising, in combination, a housing, output shaft means including impact receiving surface means mounted in said housing for rotation with respect thereto, reaction member means mounted within said housing for rotation with respect thereto and coupled to said output shaft for rotation therewith, massive rotor means including an impact delivering surface means mounted within said housing and around said reaction member means for rotation with respect thereto, motor means for applying torque to said rotor means and said reaction member means to establish rotation therebetween in either direction, automatic reversing means associated with one of the aforesaid reaction member and massive rotor means to impart oscillatory rotation therebetween to produce an impact blow in one direction between said impact delivering and said impact receiving surface means, exhaust conduit means connected to said motor means for exhausting said motor to atmosphere, and manually operable reversing means including valve means located in said exhaust conduit means for controlling the direction of said impact blow.

15. A rotary impact power device comprising, in combination, a housing, an output shaft including impact receiving surface means extending through said housing, reaction member means mounted within said housing for rotation with respect thereto and connected to said output shaft, massive rotor means mounted concentrically around at least a portion of said reaction member means for rotation with respect thereto and including impact delivering surface means for striking said impact receiving surface means, an air motor acting on said rotor means and on said reaction member means to establish rotation therebetween, automatic reversing means associated with one of the aforesaid means to impart oscillatory rotation between said rotor means and said reaction member means to cause said impact delivering surface means to strike said impact receiving surface means.

16. A rotary impact power device as set forth in claim 15, further characterized by said reaction member means having a bore extending axially thereof, means for supplying air under pressure to said bore, and a conduit from said bore to said air motor.

17. A rotary impact power device comprising, in combination, a housing, central shaft reaction member means, including impact receiving surface means and mounted through said housing for rotation with respect thereto, massive rotor means including impact delivering surface means mounted within said housing for rotation with respect thereto, motor means for applying torque to said rotor means and said central shaft reaction member means to establish rotation therebetween in either direction, automatic reversing means including rotary position valve means associated with at least one of the aforesaid central shaft reaction member means and massive rotor means so that the direction of the application of the torque is dependent upon the relative rotary positions of the impact receiving and impact delivering surface means for delivering an impact blow in one direction.

18. A rotary impact power device comprising, in combination, a housing, central shaft reaction member means including impact receiving surface means mounted for rotation and extending through said housing, massive rotor means mounted concentrically around at least a portion of said central shaft reaction member means for rotation with respect thereto and including impact delivering surface means for striking said impact receiving surface means, an air motor acting on said rotor means and on said central shaft reaction member means to establish rotation therebetween, automatic reversing means associated with one of the aforesaid means to impart oscillatory rotation between said rotor means and said central shaft reaction member means to cause said impact delivering surface means to strike said impact receiving surface means.

19. In a rotary impact power tool, a housing, a central reaction shaft having a longitudinal bore therethrough mounted within said housing, a rotor mounted around said reaction shaft for limited rotation with respect thereto and for rotation with respect to said housing, an ouput shaft extending through said housing and in driving engagement with said reaction shaft, air driven motor means for driving said reaction shaft and said rotor and including a motor chamber end plate having at least two holes therethrough from the motor chamber to the outside, an exhaust valve plate movably mounted outside of said end plate and snug against it for controlling passage of air through said holes, said central reaction shaft having a cam portion in engagement with said valve plate, the relative rotation of said reaction shaft and said rotor moving said valve plate to close one or the other of said two openings.

20. In a rotary impact power device, a housing, motor means, massive rotor means forming part of said motor means and mounted within said housing for rotation with respect thereto and including an impact delivering surface means, reaction member means forming part of said motor means and including impact receiving surface means mounted concentric with said rotor means for rotation within said housing and extending to the outside thereof for coupling to a work piece, said motor means producing oscillatory rotation of said rotor means to cause impact action between said concentrically mounted impact delivering and impact receiving surface means and also producing alternate forward and backward reaction torques on said reaction member means, at least a portion of the said backward motor reaction torque on said reaction member means being taken on said work piece.

References Cited by the Examiner
UNITED STATES PATENTS

| | | | |
|---|---|---|---|
| 2,543,979 | 3/51 | Maurer | 81—52.3 X |
| 2,768,546 | 10/56 | Amtsberg | 81—52.3 |
| 2,784,625 | 3/57 | Maurer | 81—52.3 |
| 2,825,436 | 3/58 | Amtsberg | 81—52.3 X |
| 2,842,994 | 7/58 | Stine | 81—52.3 |
| 2,881,885 | 4/59 | Short | 81—52.3 X |
| 2,886,997 | 5/59 | Madsen | 81—52.3 |
| 2,897,932 | 8/59 | Morgan | 192—44 |
| 2,898,791 | 8/59 | Maurer | 81—52.3 |
| 2,940,566 | 6/60 | Conover | 81—52.3 X |
| 2,961,903 | 11/60 | Roggenburk | 81—52.3 |
| 2,974,553 | 3/61 | Donowick | 81—52.3 |

WILLIAM FELDMAN, *Primary Examiner.*

MORRIS M. FRITZ, *Examiner.*